No. 749,439. PATENTED JAN. 12, 1904.
J. D. IHLDER.
ELECTRICAL CONTROLLING APPARATUS.
APPLICATION FILED MAR. 22, 1902.
NO MODEL. 3 SHEETS—SHEET 3.

Witnesses
Inventor
John D. Ihlder
Attorneys

No. 749,439.                                                                                   Patented January 12, 1904.

UNITED STATES PATENT OFFICE.

JOHN D. IHLDER, OF YONKERS, NEW YORK, ASSIGNOR TO OTIS ELEVATOR COMPANY, OF EAST ORANGE, NEW JERSEY, A CORPORATION OF NEW JERSEY.

ELECTRICAL CONTROLLING APPARATUS.

SPECIFICATION forming part of Letters Patent No. 749,439, dated January 12, 1904.

Application filed March 22, 1902. Serial No. 99,541. (No model.)

*To all whom it may concern:*

Be it known that I, JOHN D. IHLDER, a citizen of the United States, residing at Yonkers, in the county of Westchester and State of New York, have invented certain new and useful Improvements in Electrical Controlling Apparatus, of which the following is a specification.

My invention relates, broadly, to motor control and also to the control of motors for elevators or hoists.

While some of the features of my invention are applicable to motors in general, others relate to alternating-current motors, as induction-motors.

One of the objects of my invention is to give greater control of motors than heretofore, particularly as applied to elevators, whereby accidents are prevented and smooth running obtained.

Another object is to increase the flexibility of the speed control of alternating-current motors for elevator service.

Further objects of my invention will hereinafter appear in the accompanying specification.

My invention consists in means for carrying out the above objects, and it further consists in the apparatus having the general mode of operation, as hereinafter fully described and shown in the accompanying specification and drawings, in which—

Figure 1:
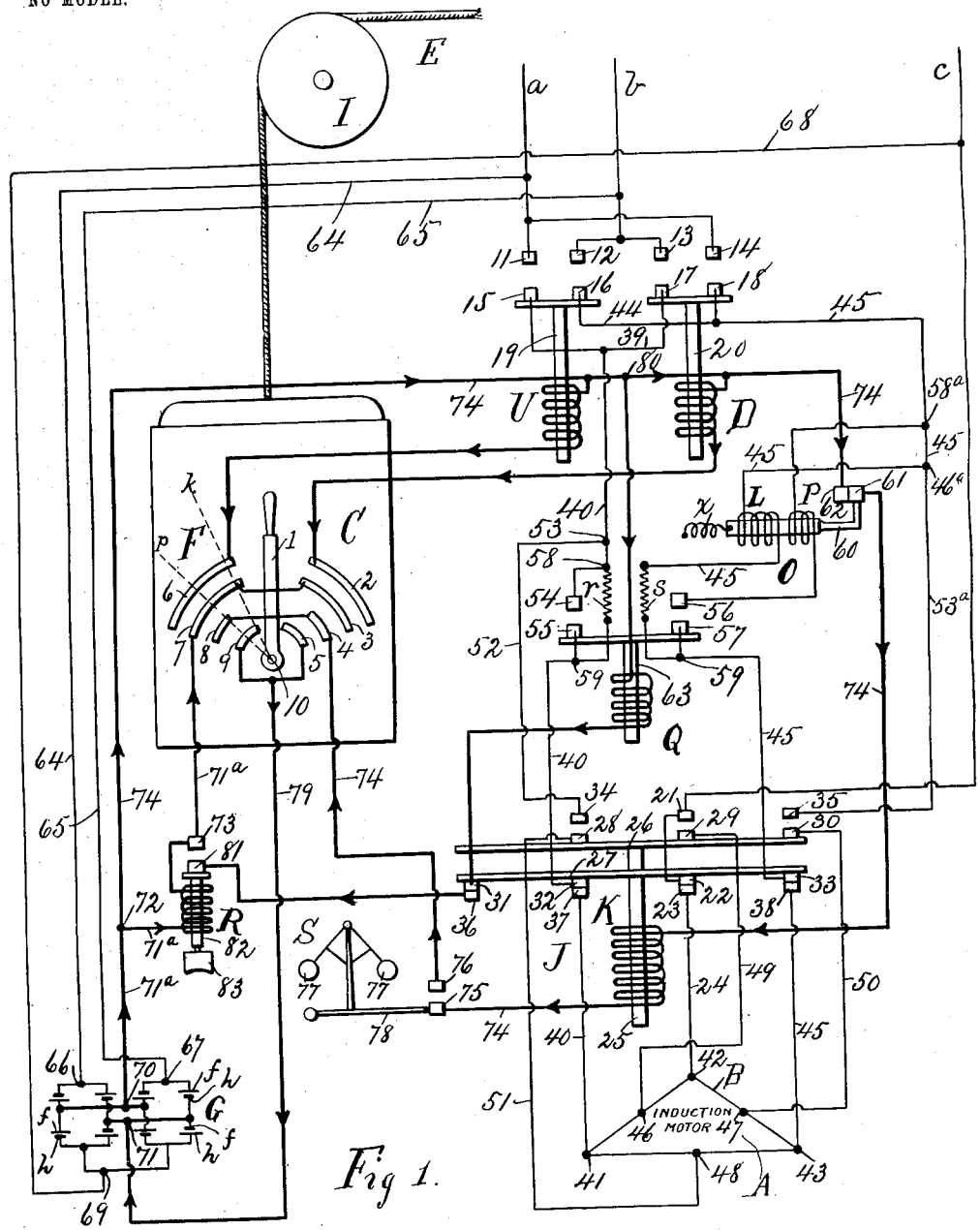
Figure 2:
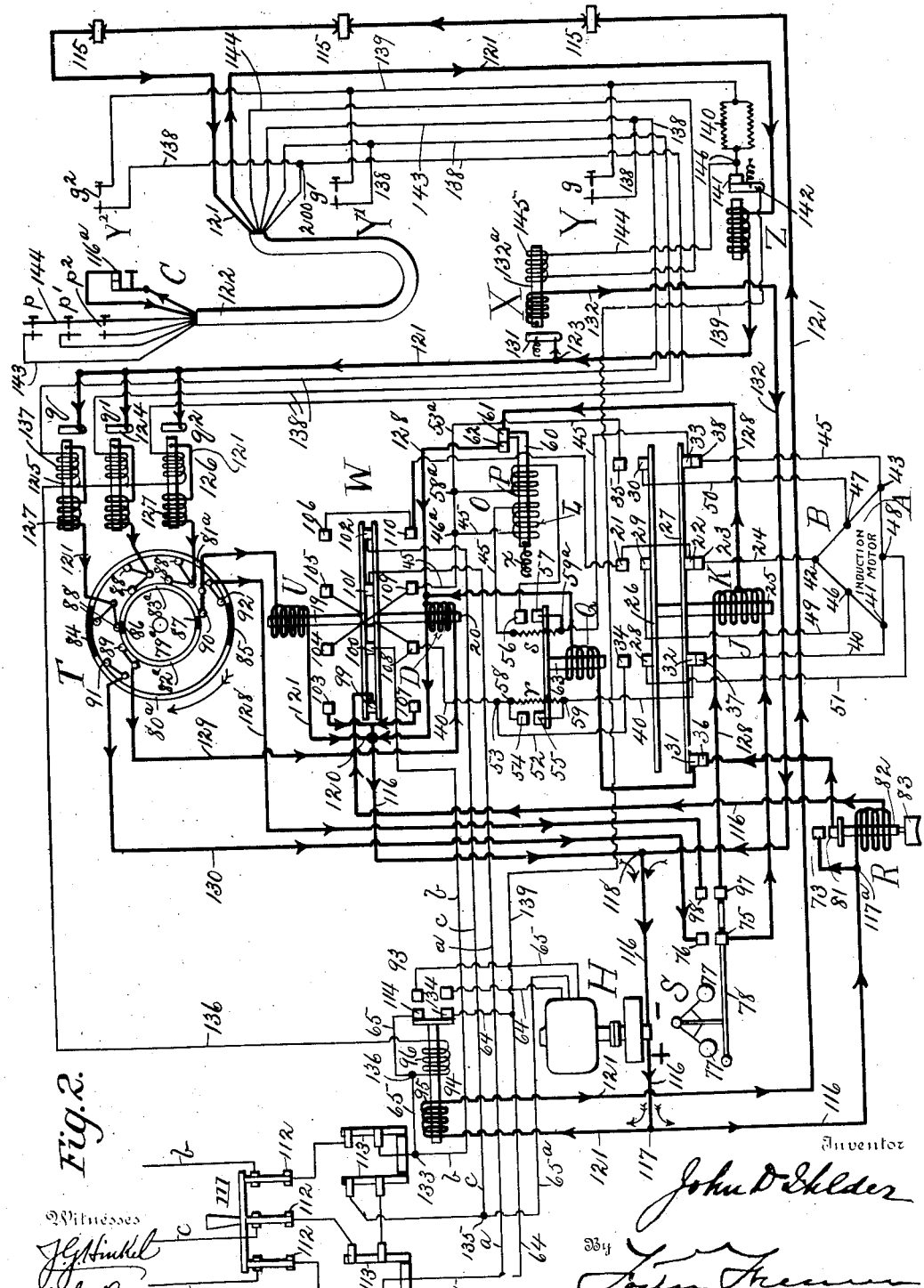
Figure 3:
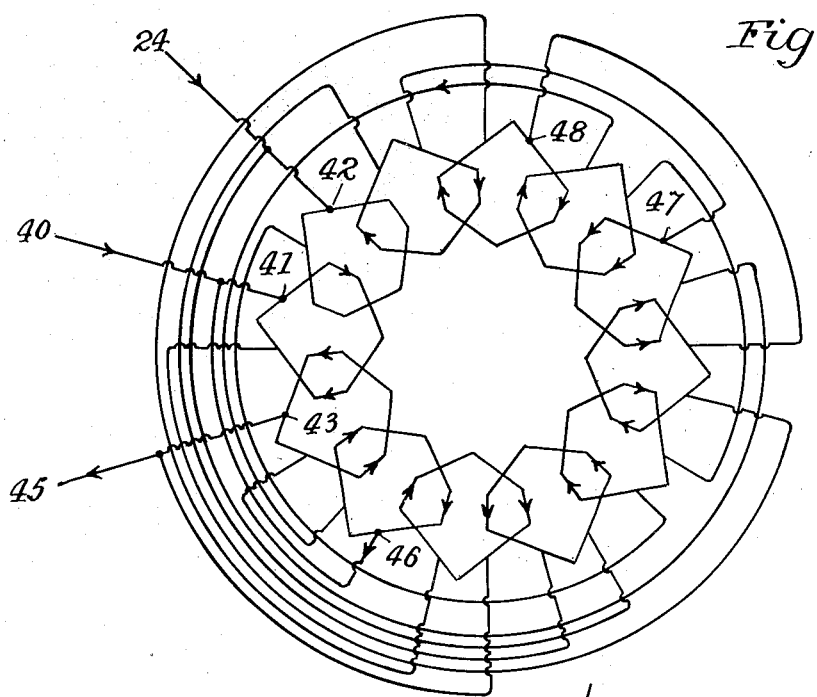
Figure 4:
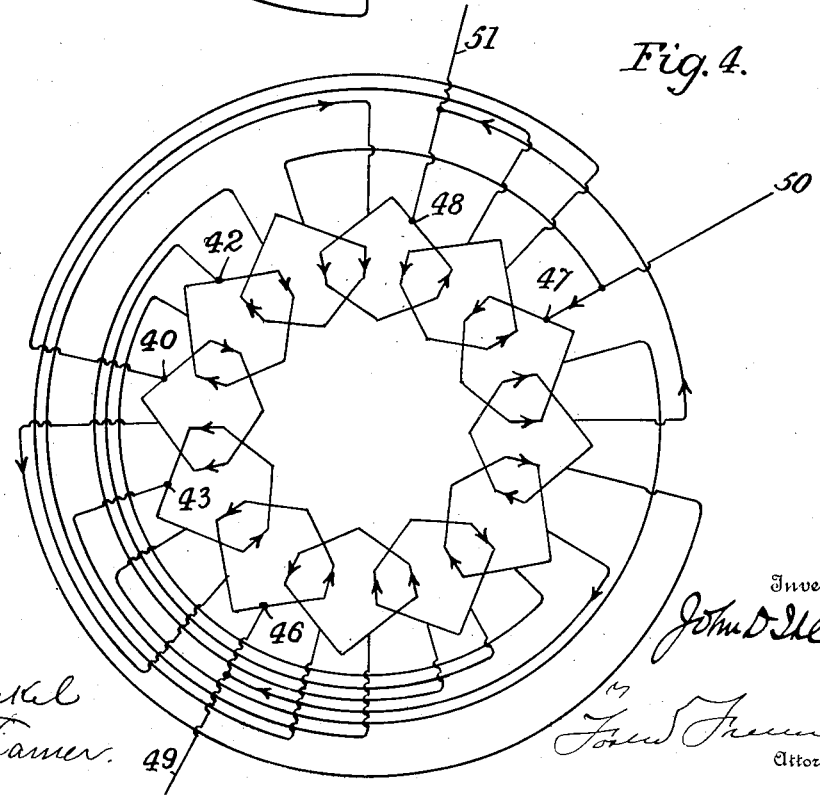

Figure 1 is a diagrammatic representation of apparatus illustrating my invention. Fig. 2 is a diagrammatic representation of apparatus embodying another form of my invention. Fig. 3 is a wiring diagram showing the connections for eight poles on the stator. Fig. 4 is the same wiring diagram showing the connections for four poles on the stator.

Referring to the drawings, I have illustrated my invention by showing a motor in connection with an elevator or hoist, although I am not to be understood as limiting my invention to elevator apparatus, for my system of motor control may be used wherever it is applicable. In this instance the motor A is an induction-motor, in the representation of which for the sake of simplicity the stator-circuits B are indicated diagrammatically, and none of the mechanical parts of the motor are shown.

There may be any suitable connections between the motor A and the elevator-car C for operating the car, in Fig. 1 a portion of these connections being shown as a sheave I and cable E, part of which is broken away.

In Fig. 1 means are shown for starting, stopping, and reversing the motor and for controlling its operation, in this instance a hand-switch F being indicated for controlling the motor and movements of the car. The switch F may be located in any convenient position relative to the elevator apparatus; but, as shown, it is preferably placed upon the car and adapted to be manipulated by the operator in the car.

In Fig. 2 instead of a single switch for controlling the operation of the motor and the movements of the car what is commonly known as a "push-button" system of control is diagrammatically presented, wherein switches or push-buttons are arranged at each floor or station and switches or push-buttons corresponding to the floors or stations are arranged upon the car and there are controlling-circuits connected from the switches at the floors or stations and on the car to the motor, whereby the operation of the motor is controlled. In the system shown in Fig. 2 a car may be called to a station, and having reached its destination it will be automatically stopped, while in the system illustrated in Fig. 1 the car must be stopped by the movement of the controlling-switch F, placed upon the car.

In both of the diagrams shown in Figs. 1 and 2 the light lines indicate alternating-current circuits, including the supply-mains and the motor-circuits, and in some instances a portion of the controlling-circuits for the motor, while the heavy lines indicate controlling-circuits for the motor, or, in other words, circuits which include controlling apparatus, and while these circuits might be supplied with alternating current I prefer to provide means for supplying the circuits indicated as described by heavy lines with current of low potential, which may be rectified alternating current. Various means may be provided for supplying rectified current to certain of the controlling-circuits of the motor. As indicated in Fig. 1, electrolytic-current-rectifying cells G are so connected in circuit that the required rectified current will be supplied therefrom.

In Fig. 2 a motor-generator H is indicated for supplying rectified current to the desired controlling-circuits. In both the case of the electrolytic cells G and the motor-generator H the alternating current to be rectified may be supplied from a separate source from that which supplies the elevator-motor A, or said alternating current to be rectified may be derived from the alternating-current mains from which the elevator-motor derives its energy, which is the preferable arrangement, and the drawings so illustrate the connections.

There are certain disadvantages connected with the use of alternating currents, especially those of high potential in circuits which extend through different portions of the building, as through the elevator-well, and alternating currents are not satisfactory ordinarily for use in electromagnetic controlling apparatus. For these and for other reasons it is preferable to supply a current of low potential to the controlling-circuits of the apparatus, and I have found that rectified currents may be readily produced and controlled and operate very satisfactorily in systems such as described. It is to be understood, however, that where the proper electromagnetic or electroreceptive controlling apparatus is provided or in any case where it may be desirable alternating currents may be used in my system of control wherever I have indicated rectified currents as supplied to the circuits.

As stated, one of the objects of my invention is to increase the flexibility of the speed control of motors, more particularly that of alternating-current motors known as "induction-motors," although my system may be used with any motor to which it is applicable. In general it may stated that I provide means for starting the motor at a slow rate of speed, then automatically increasing said speed to full speed after the motor is started and during the travel of the car, and then before the motor is stopped, according to my invention, the speed of the same is again reduced from full speed to a comparatively low rate of speed, for this enables the car to be more readily stopped on a level with the floor and leaves the car under greater control of the operator than if the arrangement were such that the motor had to be brought to a stop suddenly from full speed. There are certain refinements connected with this broad statement of the objects of my invention which will hereinafter appear, and it will be readily seen that while the motor-controlling system described is particularly applicable to hoists and elevators the system itself or portions of it may be applied to the control of the motor for other purposes.

In Fig. 1 the controlling-switch F, in this instance shown on the car, may consist of a handle $l$ and contacts 2 3 4 5 and 6 7 8 9, arranged in sets as numbered on each side thereof, the handle $l$ being pivoted at 10 and constructed of conducting material, so that when the handle is moved to one side or the other of the center it will complete circuits between the contacts, as hereinafter to be described. According to whether the handle is moved to the right or left the arrangement of circuits is such that the motor will be caused to rotate in one direction or another and at the same time circuits will be completed whereby a brake will be raised, electromagnets controlling contacts in the main motor-circuit will be energized according to the movement of the switch, and electromagnetic switches controlling the speed of the motor will be actuated.

The elevator-motor may operate upon any desired alternating-current system, in this instance, by way of illustration, a three-phase system being shown with the circuits and connections arranged accordingly.

$a$, $b$, and $c$ indicate the alternating-current mains for supplying current in this instance to the whole system, and the alternating current supplied to the mains $a$ and $b$ is led by suitable connections to contacts 11, 12, 13, and 14, adapted to coöperate with contacts 15 16 17 18, the latter contacts being arranged to be actuated by electromagnetic switches, of which U and D are represented as the controlling-magnets, preferably connected in the rectified-current circuits. When either one of the magnets U or D are energized, it raises its core 19 or 20 and closes circuit between the contacts which it controls and their coöperating contacts.

A circuit is led from the alternating-current main $c$ to a stationary contact 21 on the speed-controlling switch J, which will hereinafter be described, and from said contact 21 connection is made to a movable contact 22, adapted to be moved when the switch is actuated, but normally arranged to complete a circuit to stationary contact 23, from which connection is made by wire 24 to the stator B of the motor at a point 42. From the connections described it will be readily seen that when one of the switches controlled by solenoids U and D is actuated certain changes in the connections between the mains $a$ and $b$ and the motor will be made; but no change will be made in the connection from the main $c$ to the motor, which in this instance is the neutral connection for a three-phase system, such as shown, so that the motor may be reversed by the actuation of the switch controlled by magnet U or of that controlled by magnet D.

What I have termed a "speed-controlling switch" J is represented as an electromagnetic switch operated by an electromagnet K, preferably connected in the rectified-current circuit. The core 25 of magnet K is provided with cross-arms 26 and 27, carrying contacts 28, 29, 30, 31, 32, 22, and 33. The contacts 28, 29, and 30 coöperate with stationary contacts 34, 21, and 35, while the remaining contacts connected to the cross-arms coöperate with stationary contacts 36, 37, 23, and 38. The normal condition of the speed-changing switch J is that shown in the drawings, in which case the electromagnet K is supposed to be deënergized, and the weight of the core 25 and its connected parts maintains the contacts on cross-arms 27 in contact with stationary contacts 36, 37, 23, and 38. When electromagnet K becomes energized in the operation of my system, it raises its core 25, breaks contact between those contacts through which circuit is normally completed, and moves contacts 28, 29, and 30 to complete circuits through contacts 34, 21, and 35, thereby altering the connections to the motor for reasons hereinafter to appear.

Referring again to the motor connections from the mains $a$ and $b$, it will be seen that from a wire 39, connecting contacts 15 and 17 on the electromagnetic reversing-switch, connection is made by a wire 40 to a resistance $r$, and from thence still by wire 40 connection is made to contact 32 on switch J, and from contact 37 connection is made still by wire 40 to a point 41 on the stator-circuits. For convenience of illustration the stator-circuits are represented in mesh form, the point 41 being indicated at one of the angles or corners, as is also point 42, to which connection is made, as hereinbefore described, from the alternating-current main $c$. Connection is then made from the electromagnetic reversing-switches to the remaining angle 43 of the triangular stator connection, as follows: from a connection 44, between contacts 16 and 18, a wire 45 connects to the point $46^a$, and from thence the circuit is led still by a wire 45 through one winding L of a doubly-wound electromagnet O and still by wire 45 through a resistance $s$ and to contact 33 and from the contact 38 to the point 43 on the stator B, this circuit being easily traced by referring to the wire 45 in each instance.

From intermediate points 46, 47, and 48 on the stator connections wires 49, 50, and 51 lead, respectively, to contacts 29, 30, and 28 on the speed-changing switch J, while connection is made by a wire 52 from a point 53 on wire 40 between the electromagnetic reversing-switch and resistance $r$ to contact 34. Connection is also made by a wire $53^a$ from point $46^a$ on wire 45 between the electromagnetic reversing-switch and magnet L and resistance $s$ to the contact 35. The connection between the alternating-current main $c$ and contact 21 has already been described and from the connections indicated it will be seen that when the switch J is in its normal position, as indicated in the drawings, circuits are in readiness to be completed to certain points on the stator B, indicated as the points 41, 42, and 43 on the stator connections, while connections will be completed to other points, as 46, 47, and 48, when electromagnet K of switch J becomes energized, raises its core, and brings contacts 28, 29, and 30 against their coöperating stationary contacts 34, 21, and 35.

While the circuits of the stator on motor A are merely indicated as lines in Figs. 1 and 2 and no windings are shown, as hereinbefore described, this is for the sake of simplicity, and in Figs. 3 and 4 delta-connected wiring diagrams are shown for the stator. The object of the connections shown is to vary the speed of the motor and control its direction of rotation. Various methods may be used for varying the speed of the motor, and I have assumed that its speed is varied by changing the number of field-poles according to the well-known principle of operation of induction-motors, whereby the speed of the motor may be reduced by increasing the number of field-poles. It will be assumed in this instance that when the circuits and connections are completed from the three-phase mains to the points 41, 42, and 43 on the stator there will be a certain number of poles in the field of the motor—for instance, there may be eight poles—but when the speed-changing or pole-changing switch J has been operated to break the circuits which connect to the points 41, 42, and 43 and complete the circuits which connect to the points 46, 47, and 48 it will be assumed that the connections and winding of the stator are such that the number of poles will be reduced from, say, eight to four, so that the speed of the motor will be increased in proportion to the variation in the number of poles. My object is to start the motor at a slow rate of speed, as assumed with connections completed for eight poles on the stator, and then after a given time the connections of the stator will be changed, the number of poles will be reduced to, say, four, and the speed of the motor will be increased to full speed. I am not to be understood as limiting myself to any particular number of poles or to particular variations in the number, I having assumed the numbers given merely as illustrations of what may be accomplished according to my invention. By the circuits and connections shown between the motor and speed-changing or pole-changing switch J and the electromagnetic reversing-switches it will be readily seen that either one of the switches controlled by magnets U and D may be energized, thereby closing the contacts controlled by the cores 19 and 20, and circuits will be completed for causing the motor to rotate in one direction or another; but in either case the speed will be controlled by switch J, as described. It may be herein stated that the circuits of the rotor and its mechanical parts have not been indicated in the drawings, it being understood, of course, that the rotor may be of any suitable form for induction-motors—as, for instance, it may consist of a closed or squirrel-cage construction or winding comprising a rotating part.

In Fig. 3 a delta-connected wiring diagram is shown with the points 41, 42, and 43 marked thereon to which the wires 40, 24, and 45 are connected, the winding of the stator being such that when connected in circuit through wires 40, 24, and 45 eight poles are provided. In Fig. 4 the circuits are combined to give four poles, and, as indicated, the wires 50, 51, and 49 are led to the points 47, 48, and 49. When the switch K is operated, it is to be understood that the eight-pole combination of Fig. 3 is changed to the four-pole combination of Fig. 4. The construction of the motor forms no part of this invention, as any suitable winding may be adopted for carrying out the desired objects.

The resistances $r$ and $s$, referred to as connected in the motor-circuits, have important functions hereinafter to appear, and while they may be any suitable resistances they are preferably non-inductive. Where it is found that other electrical apparatus may take the place of these resistances and other circuits included, they may be substituted; but I will not herein enumerate equivalents. As shown in Fig. 1, each resistance is adapted to be cut out of circuit at a given time in the operation of the apparatus. As shown, means are provided for short-circuiting these resistances. Resistance $r$ is adapted to be short-circuited by the closure of contacts 54 and 55, while resistance $s$ is adapted to be short-circuited by the closure of contacts 56 and 57. The closure of contacts 54 and 55 completes a short circuit directly from the point 58 around the resistance to the point 59 on wire 40, while the closure of contacts 56 and 57 completes a short circuit around resistance $s$ from the point $58^a$ on wire 45 through a winding P on the doubly-wound electromagnet O and through the contacts 56 and 57 to a point $59^a$, also on wire 45, thereby not only short-circuiting the resistance $s$, but also short-circuiting electromagnet L and energizing electromagnet P. The doubly-wound electromagnet O is provided with a core 60, carrying at one end a contact 61, adapted to be moved to and from the stationary contact 62, when the core 60 is actuated by magnets L and P in the manner hereinafter to be described.

Contacts 54 and 56 in the short circuits around the resistances $r$ and $s$ are in this instance arranged to be stationary, while contacts 55 and 57 are shown movable and connected to but insulated from a core 63, actuated by an electromagnet Q. When Q becomes energized, the core is raised and the contacts it controls are closed. When the magnet Q is deënergized, the weight of the core separates its contacts, the normal position being that shown in the drawings with the contacts controlled by the core separated from the stationary contacts.

I will now refer to the controlling-circuits of the motor including the switch F on the car, the reversing-magnets U and D, the magnet Q, and the magnet K of speed-changing switch J, and a magnet R for controlling the brake of the motor and hereinafter referred to as a "brake-magnet." These circuits referred to are all supplied with rectified current from a series of electrolytic rectifying-cells G, (shown in Fig. 1,) the arrangement of such cells being no part of my invention and being well known in the art. It will suffice, therefore, to say that each cell may consist of a positive electrode $f$, of aluminium, and a negative electrode $h$, of some substance such as carbon, and a suitable electrolyte, it being well known that a cell so constructed possesses the property of allowing one impulse of an alternating current to pass therethrough in the direction from carbon to aluminium when the aluminium electrode is connected to the positive pole of the source of supply, while the other impulse of the alternating current in the direction from aluminium to carbon may not pass. It is obvious that cells may be so grouped that both impulses of an alternating current may be rectified—that is, directed over the common circuit in the same direction. This is accomplished by the arrangement shown in Fig. 1. Connections are made by wires 64 and 65 from the mains $a\ b$ to points 66 and 67 on the connections between the groups of cells, while a connection is made from the alternating-current main $c$ by wire 68 to a point 69 on the opposite side of the connections of the groups of cells. Alternating current then passing to the groups of cells over wires 64, 65, and 68 is rectified and energizes the circuits indicated in the heavy lines, passing as rectified current from a point 70 on the connections between the cells and returns to the cells at the point 71.

From the point 70, from which the rectified current starts, a circuit is led by wire $71^a$ to the point 72, and from thence a branch passes by wire $71^a$ through the brake-magnet R to a stationary contact 73 and from thence still by wire $71^a$ to contact 7 of switch F, contact 7 being connected with contact 3 of said switch. Another branch passes from the point 72 by wire 74 to the magnets U and D, the circuits of which connect to contacts 6 and 2, respectively, of switch F, while wire 74 continues from said magnets U and D to contact 62, then to contact 61 by wire 74 to and through magnet K of switch J, then through contacts 75 and 76, which are normally open, still by wire 74 to contact 4 of switch F, which contact is in turn connected with contact 8 of said switch.

Referring briefly to contacts 75 and 76 in the circuit formed by wire 74, it will be seen that I provide means for controlling said contacts. (Shown as a governor S.) In this instance it is shown as an ordinary ball-governor operating in accordance with the speed of the motor. Any suitable connections may be provided between the motor and the governor whereby the governor operates in accordance with the speed of the motor; but for the sake of simplicity and because the mechanical parts of the motor are not shown a governor is merely indicated diagrammatically, it being understood that upon an increase of speed in the motor the governor-balls 77 fly outward and raise the rod 78, to which is connected contact 75, thereby bringing said contact against contact 76 and closing the circuit 74 at this point. The governor S is intended to close the circuit between contact 75 and 76 only at a predetermined speed of the motor. It may be stated that the governor S is a mechanical equivalent of the doubly-wound electromagnet O in the operation of my improved apparatus and they have the same function, so that it is not necessary that both should be used at the same time. Either the governor S and its contacts or the doubly-wound electromagnet O and its contacts may be used for controlling the circuit 74.

From switch F a return-circuit is completed to the cells G at the point 71, as shown, contacts 5 and 9 on the switch being electrically connected, and a wire 79 leads therefrom to the point 71 on the cells G. The direction of current in the circuits indicated in heavy lines for the rectified current may readily be traced by means of the arrow placed upon the wires, and it will thus be seen that there is a branch circuit leading from the point 80 on wire 74 adjacent to electromagnets U and D and including electromagnet Q, contacts 31 and 36, controlled by the speed-changing switch J, and terminating at contact 81, connected to be moved by the core 82 of brake-magnet R. When the brake-magnet R becomes energized, it is adapted to raise its core 82 and close a circuit between contacts 73 and 81. Any suitable brake may be provided connected to be actuated by the brake-magnet R, as shown, a brake-shoe 83, being mechanically connected to the core 82 of magnet R, so that when the core 82 is raised it raises the brake-shoe 83 and allows the motor to start.

Referring again to switch F on the car, it will be noted that contacts 4 and 8 on the switch do not extend inwardly toward the movable arm 1 as far as the remaining contacts of the switch, so that when the arm 1 is moved to one side or the other across its contacts circuit is not completed at first through either one of contacts 4 or 8, according to the direction of movement of the arm, for it is not desired that the circuits leading to contacts 4 and 8 should be in a condition to be energized when the arm is first moved.

The fundamental principles of the operation of the apparatus shown in Figs. 1 and 2 are identical, and a description of the operation of the apparatus as it is illustrated in Fig. 1 applies equally well to Fig. 2, although in Fig. 2 further features of my invention are illustrated.

The operation of the apparatus shown in Fig. 1 is as follows: Assuming the apparatus to be in the condition shown in the drawings with the brake applied to the motor and the motor at rest and the circuits deënergized, let it be desired to start the motor in a given direction, as in a direction to start the car upward. For this purpose electromagnet U should be energized, we will say, and therefore the arm 1 of switch F should be moved to the left as the figure is viewed, causing it to sweep over contacts 6, 7, 8, and 9. As soon as the arm has assumed the position indicated in dotted lines at $k$ circuits energized by rectified current will be completed as follows: from the point 70 on the groups of cells G by wire $71^a$ to the point 72, from thence by wire 74 to and through electromagnet U and to the contact 6 of switch F, then through the arm 1 to contact 9, and thence by wire 79 back to the cells G, thereby energizing the electromagnet U, causing it to raise its core 19 and complete the motor-circuits through contacts 11 and 15 and 12 16. By the movement of arm 1 to the position marked in dotted lines at $k$ a branch circuit has been completed from the point 72 at the junction of wires 74 and $71^a$ through brake-magnet R to contact 73, thence by wire $71^a$ to contact 7 on switch F and through arm 1 to contact 9 and, as before, by wire 79 to the cells G, thereby supplying current to the brake-magnet R. The closure of the motor-circuit at contacts 11 15 and 12 16 completes the alternating-current circuit to the motor from main $a$ through contacts 11 15 and by wire 40 to and through resistance $r$, thence still by wire 40 to and through contacts 32 37, and thence to the point 41 on the circuit of the stator. The alternating-current circuit to the motor is completed from main $b$ through contacts 12 16 and by wire 45 to the point $46^a$, thence still by wire 45 to and through electromagnet L, thence through resistance $s$ and by wire 45 through contacts 33 38, thence still by wire 45 to the point 43 on the stator-circuits. The circuit to the motor from main $c$ is already completed from said main through contacts 21, 22, and 23 to the point 42 on the stator-circuits. At this stage of the operation of starting the motor only enough current is admitted to the stator B to prevent backward rotation of the motor, because the maximum resistance at $r$ and $s$ is connected in the stator-circuit and the motor is prevented from receiving the full current when the circuit is first closed. When the motor-circuits are closed at the electromagnetic reversing-switch by the energizing of electromagnet U, the circuit of the brake-magnet R is closed at the same time; but the brake will not be raised immediately, because said brake-magnet R requires a certain time to act. The brake-magnet controls contacts 73 and 81 included, as described, in the circuit of electromagnet Q, which actuates contacts 55 and 57, thereby controlling the short circuits around resistances $r$ and $s$, and magnet Q cannot be energized until brake-magnet R has acted to raise the brake and close the circuit of magnet Q at contacts 73 and 81. It will therefore be seen that the resistances $r$ and $s$ in the stator-circuit cannot be cut out or short-circuited until the brake has been operated—that is, until the core 82 of brake-magnet R has been raised, thereby raising the brake. When contacts 73 and 81 are closed by the raising of core 82 of brake-magnet R, a rectified-current circuit will be completed from the point 80 adjacent magnets U and D to and through magnet Q, through contacts 31 and 36, thence through contacts 81 and 73 to contact 7 of switch F, and then through arm 1 to contact 9 and out to the cells G.

Before describing the operation which takes place when magnet Q becomes energized reference will be made to the winding L, shown as an alternating-current winding of doubly-wound magnet O. As soon as current is admitted to the stator through resistances $r$ and $s$ magnet L becomes energized and moves its core 60 in a direction to separate contacts 62 and 61, thereby breaking the circuit connected thereto, and contacts 61 and 62 will be held separated as long as magnet L remains energized, thereby preventing magnet K of speed-changing switch J from being energized until said contacts 61 and 62 are again closed. Provision is made for the closing of said contacts, as will be seen shortly.

Now referring again to magnet Q, the energizing of said magnet causes the closure of short-circuits between contacts 54 55 and 56 57 around resistances $r$ and $s$, thereby admitting full current to the motor. The short-circuiting of resistance $s$ serves to deënergize electromagnets L of doubly-wound magnet O, but at the same time energizes magnet P, which is of sufficient strength only to maintain the core 60 in the position to which it is moved by magnet L, thereby keeping the circuit open between the contacts 61 and 62. Contacts 61 and 62 are held open through the operation of magnet P until the current reduces to normal running current, at which time magnet P becomes so much weakened that it allows the core 60 to return to its normal position under the influence of a suitable spring $x$, thereby closing contacts 61 and 62 and allowing magnet K of speed-changing switch J to become energized. As stated, it is not necessary nor desirable that both the governor S and the doubly-wound electromagnet O should be used at the same time, and if the doubly-wound magnet O is connected in circuit as described and the governor S and its contacts 75 and 76 are not used as soon as the circuit of magnet K is completed at contacts 61 and 62 the magnet K will become energized. For the sake of convenience both magnet O and governor S are shown connected with the apparatus at the same time, and even should both these devices be used they could be adjusted to operate substantially simultaneously, for, as stated, magnet P does not allow contacts 61 and 62 to close until the motor has reached full slow speed, when the current reduces to normal running current, and governor S should be so adjusted that it does not operate to close contacts 75 and 76 until the motor has reached approximately full slow speed.

It will now be seen why contacts 4 and 8 on reversing-switch F are made somewhat shorter than the remaining contacts, for it is evident that the circuit of magnet K cannot be completed until arm 1 has been moved to a position indicated in dotted lines at $p$, in which position the arm is in contact with contact 8, which is connected in the circuit of magnet K. It will be seen that with the arm 1 in the position marked $k$ in dotted lines magnet U is energized, closing the motor-circuits first through resistance, whereby a minimum current is admitted to the stator, with the connections such that the motor will start at a slow rate of speed and come up to approximately full slow speed when the maximum current is admitted thereto, while brake-magnet R has become energized and has raised the brake completing the circuit of magnet Q, which operates to short-circuit resistances $r$ and $s$. It will thus be seen that the current is admitted to the motor in a series of steps, in this instance the current being admitted in two steps, first the minimum current being admitted to the motor through resistances $r$ and $s$, and then said resistances are automatically cut out of circuit or, as shown, short-circuited after the brake has been actuated and full current is admitted to the motor, with the connections completed for slow speed— that is, the stator will be provided with the maximum number of poles. Then after the motor has started at slow speed and has reached approximately full slow speed the contacts 61 and 62, controlled by magnets L and P, will be actuated to close the circuit of magnet K, or else contacts 75 and 76, controlled by the governor S, will be actuated to close said circuit, and at this time the arm 1 should have been moved to close circuit with contact 8 on reversing-switch F.

The operation of the apparatus having been traced to this point—that is, to a point where current has been admitted to the stator in two steps and the motor has been brought up to approximately full slow speed—the next step is that whereby the speed of the motor is changed from slow to fast. The speed of the motor is increased from a slow rate of speed to fast speed when magnet K becomes energized and raises its core 25, thereby breaking the slow-speed connections and completing the high-speed connections to the motor. In other words, the number of poles of the stator is changed from, as was assumed, eight to a lesser number—four, we will say—whereby the speed of the motor is increased.

It will be readily appreciated how the refinements I have set forth in motor control operate to cause a smooth and easy starting of the elevator-car to which the motor is connected, whereby easy running is obtained, and the circuits and connections controlled by the brake-magnet R are such that accidents are prevented and safety in operation is assured.

According to my invention means are provided for returning to a slow rate of speed from full speed before the motor is stopped—that is, before the car reaches its destination. In the diagram of circuits and connections shown in Fig. 1 the motor is stopped by moving the arm 1 in a reverse direction from which it was moved to start the motor.

Before describing the operation which takes place when the motor is about to be stopped it will be recalled that the circuit of magnet Q has been described as including contacts 31 and 36, one of which contacts, as 31, is shown connected to the cross-arm 27 of speed-changing switch J, so that when core 25 of said switch is raised by magnet K to change from slow to fast speed the circuit of magnet Q is broken at contacts 31 and 36, thereby deenergizing said magnet, and the core 63 thereof falls, thereby opening the short circuits, which have previously been closed around resistances $r$ and $s;$ but resistances $r$ and $s$ are not thrown back into the motor-circuit at this stage, since it will be seen that short circuits are still completed around said resistances by means of wires 52 and 53ª, so that the speed of the motor is not affected by the opening of contacts 54 55 and 56 57. The reason for deenergizing magnet Q when the connections are changed from slow to fast speed will be apparent from the description of the stopping of the motor, and it may be said in general that when it is desired to stop the motor and change from fast to slow speed if the switch J were actuated to change directly from fast-speed connections to slow-speed connections without the interposition of any resistance in the motor-circuit the slowing down of the motor would take place too quickly, and it is my object to slow the motor down by degrees or gradually.

From the operation described with regard to the resistances $r$ and $s$ it will be seen that when arm 1 of switch F has been moved in its reversed direction from the position marked $p$ to the position marked $h$ the circuit of magnet K of speed-changing switch J will be broken between contact 8 on switch F and the arm 1, magnet K will be deënergized, its core 25 and cross-arms carrying contacts will drop, and the slow-speed connections for the motor will be completed; but instead of being completed through circuits connected directly to the mains they will be completed through the resistances $r$ and $s$, because, as described, the short circuits around these resistances have been previously opened.

It is true that when the slow-speed connections of the motor are completed by the deenergizing of magnet K contacts 31 and 36 are again closed, thereby completing the circuit of magnet Q; but on account of the time constant of magnet Q it will take time to act, and hence resistances $r$ and $s$ will be maintained in the circuit of the motor for an appreciable length of time after the connections have been changed from fast to slow. Then as soon as magnet Q becomes energized resistances $r$ and $s$ will be short-circuited by the closure of contacts 54 55 and 56 57, thereby slowing the motor down by degrees and preventing a too quick slowing down. In order to finally stop the motor, the arm 1 is moved clear of contacts 6, 7, and 9, the circuit of magnet U is broken, the motor-circuits are broken, and brake-magnet R is deënergized, whereby the motor is stopped and the brake applied.

It will be seen that according to my invention a small current is admitted to the motor before the brake is removed; but the brake is removed before maximum current—that is, before full current is admitted to the motor—and this all takes place with the motor connections arranged for slow speed. The current is admitted to the motor gradually or, as described, in steps, in this instance the current being admitted in two steps, and the admission of current to the motor is, in fact, controlled by the operation of the brake. The means for changing the speed of the motor from a slow rate to a high rate is controlled electromagnetically by the doubly-wound electromagnet O or mechanically by means of the governor S—that is to say, the circuit of magnet K, which actuates the speed-changing switch J, is controlled by the governor S, dependent for its operation upon the speed of the motor, or else the circuit of said magnet K is controlled by magnets L and P, magnet P depending for its operation upon the speed of the motor, because it will not allow contacts 61 and 62 to close until the motor has reached full slow speed and the current has reduced to normal.

Because of the fact that in stopping the motor it is reduced from a high speed to a slow speed and allowed to operate at said slow speed for an appreciable time before being stopped an elevator-car connected to be operated by the motor may be more readily controlled and stopped more exactly at its desired station without inconvenience to the passengers or derangement to the apparatus.

As hereinbefore stated, in Fig. 2 apparatus operating in accordance with the principles described is diagrammatically illustrated in connection with an automatic push-button system for elevators, in which Y Y' Y² represent floors or stations, of which there may be any desired number, but three being illustrated, and switches or push-buttons $g$, $g'$, and $g^2$ are provided, one at each floor, for controlling the operation of the motor A through certain controlling-circuits and apparatus. Preferably switches or push-buttons $p$, $p'$, and $p^2$, corresponding to the floors or stations, are provided upon the car also for controlling the operation of the motor from the car. Means are provided for automatically stopping the car at the stations to which it has been called from a floor or station or at the floor to which it has been directed from the car by means of a car-switch or push-button. In this instance in order to accomplish this end a floor-controller T is shown connected to the controlling-circuits of the motor, through which the circuits are completed when the motor is started and at which the motor-controlling circuits are automatically broken when the car reaches its destination.

The floor-controller T is represented diagrammatically as consisting of a disk 79ª, provided with outer and inner conducting-segments 80ª 81ª and 82ª 83ª, the segments 80ª 81ª being insulated from each other by a suitable insulation 84 85, and the segments 82ª 83ª being insulated from each other by insulation 86 87. Brushes 88, connected to each other in pairs corresponding to the floors or stations, are arranged to bear upon the conducting-segments of the disk, while brushes 89 and 90 are arranged to bear upon the inner segments and are electrically connected to the up and down relays U and D or magnets controlling the direction of rotation of the motor, brush 89 being connected to relay D and brush 90 being connected to relay U. Brushes 91 and 92 are also arranged to bear upon the outer segments of the disk and are each connected to magnet K of the speed-changing switch J, operating as hereinbefore described with reference to Fig. 1.

The disk T is adapted to be connected to the motor through suitable mechanical connections, so that it will be rotated by the motor in unison with the travel of the car and break the controlling-circuits as the brushes reach the portions of insulation, thereby stopping the motor and bringing the car to rest at the desired station. Assuming that a car is traveling upward from the station Y, the arrangement of the disk 79ª, its segments, insulating portions, and brushes is such that any brush bearing upon the outer segment will reach an insulated portion and travel thereon before the corresponding brush bearing upon the inner segment will reach an inner portion of insulation. For instance, assuming a circuit to have been completed through a pair of brushes 88 through segments 83ª and 81ª to brushes 90 and 92, then when the disk is traveling in the direction of the arrow the outer brush 88, bearing on segment 81ª, will reach the end of the segment and pass on to the insulating portion 84, thereby breaking the circuit between brush 88 and brush 92 before brush 88, bearing on the inner segment 83ª, reaches insulation 86 and travels thereon, thereby breaking circuit between the inner brush 88 and brush 90. In order to accomplish this end, the portions of insulation 84 and 85 are made considerably longer in a circumferential direction than are the portions of insulation 86 and 87, and the pairs of brushes, as shown, are not arranged upon the radii of the section of disk 79, but rather upon cords thereof. The reason for this construction will hereinafter appear; but it may be briefly stated that in the operation of the apparatus it is desired to break circuit of magnet K, controlling the speed-changing switch J, before the circuit of an up or down relay U or D is broken, as the case may be, because the circuit of a relay or magnet U or D must be broken or de-energized last, for the motor-circuits are thereby broken and the motor stopped. Floor-controllers operating on substantially the same principle as the floor-controller herein described have heretofore been disclosed in patents granted to me—as, for instance, in United States Patent No. 683,689, dated October 1, 1901—and it is not deemed necessary in the present application to more than refer to the general principles of operation of such floor-controllers. The floor-controller T is adapted to be rotated in one direction or another, according to the rotation of the motor, and in the position shown it is presumed that the car has been brought to the first floor and stopped, that pair of brushes 88 corresponding to the first floor or station being shown bearing upon the insulated portions 84 and 86. In this position of the floor-controller it will be seen that brushes 89 and 91 bear upon the opposite segments 82ª and 80ª to those segments upon which the remaining brushes bear. The function and operation of the floor-controller T will be hereinafter more clearly brought out when the remainder of the apparatus has been described and the operation of the whole system is referred to.

Before describing in detail any of the circuits shown in Fig. 2 it may be stated generally that preferably low-potential current is supplied in this instance to certain motor-controlling circuits by means of a motor-generator H, the motor end of which is electrically connected to the alternating-current mains by means of a suitable switch 93, operated in this instance by a doubly-wound electromagnet 94, provided with a coil 95, supplied with rectified or direct current from the generator end of the motor-generator and also provided with an alternating-current coil 96, energized from the alternating-current mains $a$, $b$, and $c$. As shown in Fig. 1, the apparatus illustrated in Fig. 2 comprises in addition to the speed-changing switch J, actuated by an electromagnet K, a brake or brake-shoe 83, controlled by a brake-magnet R and in turn controlling contacts 81 and 73, a governor S, shown as a ball-governor, controlling contacts 75 and 76 and in this instance also controlling additional contacts 97 98, a reversing-switch W, actuated in one direction or another by relays or magnets U and D, provided with cores 19 and 20, connected to move a series of contacts 99 100 101 102, so that if relay U is energized the contacts referred to will be moved against coöperating contacts 103 104 105 106, while if relay D is energized the said centrally-located contacts will be moved against coöperating contacts 107, 108, 109, and 110, to all of which contacts circuits leading to and from the motor are connected, as well as certain of the controlling-circuits.

As shown in Fig. 1, the apparatus of Fig. 2 is also provided with a doubly-wound electromagnet O, provided with alternating-current coils L and P, controlling a core 60, which actuates a contact 61, moving it to and from the contact 62.

Referring now more particularly to the motor-circuits, the mains $a\ b\ c$, shown in this instance as three-phase alternating-current circuits, are provided with a main switch 111, consisting of contacts connected to each other and hinged at the points 112 and adapted to bridge across gaps in the circuits of the mains $a\ b\ c$ when the switch is closed. This switch may be of any suitable construction, or what is known as a "knife-edge" switch. Other switches are shown in the circuit of the mains $a\ b\ c$, consisting also of knife-edge contacts 113, adapted to complete the circuit between stationary contacts included in the mains $a\ b\ c$. The main $a$ is connected to contact 101 of reversing-switch W. The main $b$ is connected to contact 100 of reversing-switch W, while the main $c$ is connected to contact 102 of said reversing-switch. Contacts 105 108 and 104 109 on said reversing-switch are cross-connected to each other, respectively, and contacts 103 and 107, 106 and 110 are connected to each other. Connection is made from contact 110 on the reversing-switch W to contact 21 on speed-changing switch J, from thence to contact 22, and from contact 23 by wire 24 to the point 42 on the stator B. This circuit just traced connecting with the main $c$ when the movable contacts of switch W are moved to one side or the other constitutes the neutral connection of the three-phase system, and its connection to the motor is not altered by the movement of the reversing-switch. Contact 108 on the reversing-switch is connected through resistance $r$ by wire 40 to contact 32 of speed-changing switch J and from contact 37 thereof, still by wire 40 to the point 41 of the stator B, while contact 109 of the reversing-switch is connected by wire 45 through magnet L and resistance $s$ to contacts 33 of speed-changing switch J and from contact 38 thereof still by wire 45 to the point 43 of the stator B. Short circuits are adapted to be completed around resistances $r$ and $s$ from points 58 and $58^a$ to points 59 and $59^a$, the short circuit around resistance $r$ being completed by means of contacts 54 and 55, while the short circuit around resistance $s$ is adapted to be completed by means of contacts 56 and 57, and said latter short circuit includes the magnet P of the doubly-wound electromagnet O. A connection is also made from the point 53 on the wire 40 to contact 34 of speed-changing switch J, and connection is made by wire $53^a$ around resistance $s$ and magnet O to contact 35 of speed-changing switch J.

Magnet Q controls a core 63, provided with a cross-arm carrying contacts 55 and 57, so that when the magnet Q becomes energized it raises core 63 and closes circuit between contacts 54 55 and 56 57, thereby short-circuiting resistances $r$ and $s$ and energizing magnet P, thereby deënergizing magnet L. According to which one of the magnets U or D is energized the centrally-located contacts on the reversing-switch W are moved to one side or the other and the circuits for the motor are completed to cause it to rotate in one direction or another, and when magnet K is energized it raises its core 25 and with it cross-arms 26 and 27, thereby breaking the circuit completed through the lower set of contacts of said speed-changing switch J and completing circuit with the upper set of contacts on said switch. As described in connection with Fig. 1, when switch J is operated the connections for the stator are so changed that its number of poles is altered and the speed of the motor is varied thereby. It will be assumed, as before, that when the connections through the reversing switch and speed-changing switch are such that circuit is completed to the points 41, 42, and 43 on the stator B the motor will be provided with, we will say, eight poles, thereby tending to rotate at a comparatively slow rate of speed, while when the connections to the points 41, 42, and 43 are broken and those to the points 46, 47, and 48 are completed the number of poles, we will say, has been reduced from eight to four and the speed of the motor will be thereby increased. The operation of the doubly-wound magnet O is the same as that described for the equivalent magnet in Fig. 1—that is to say, when current is first admitted to the motor the magnet L becomes energized and separates contacts 61 and 62, and then when the circuit of magnet P is completed and magnet L deënergized contacts 61 and 62 are maintained separated until the current of the motor has reduced to normal, whereby magnet P allows contacts 61 and 62 to close and complete circuit of magnet K for actuating the speed-changing switch J. As before, the circuit of magnet K may also be controlled by the governor S, actuating contacts 75 76 and 97 98, the governor being so adjusted as to close said contacts when the motor has reached full slow speed. The contacts 31 and 36, controlled by the operation of the speed-changing switch J in this instance, as before, control the circuit of magnet Q, so that when the speed-changing switch has been actuated to change from a slow rate of speed to a fast rate contacts 31 and 36 will be broken, the circuit of magnet Q will be broken, its core 63 will be allowed to drop, and resistances $r$ and $s$ will be thereby again included in the motor-circuits. Then when the motor connections are changed upon stopping from fast to slow speed connections the resistances $r$ and $s$ will have been included in the slow-speed connections and will remain therein for an appreciable length of time until magnet Q has time to act and short-circuit said resistances again.

According to my invention I prefer to lead the low-potential circuits supplied with rectified current to the floors or stations and preferably to the car, and include in said low-potential circuits the door-contacts 115 and a safety-switch $116^a$ on the car, adapted to be hand-operated. It is preferable to supply the door-contacts and safety-switch on the car and such other safety-switches as may be desirable with low-potential current, because they are being continually operated, at least some of them are, as the door contacts, and if high-potential circuits are used sparking is excessive and dangerous. A rectified current of lower potential than the main line is also more easily manipulated and controlled than are alternating currents of high potential, so that I also prefer to use the rectified current supplied to the controlling-circuits wherever convenient. I have found that it may conveniently be used through the circuits of the floor-controller T and through circuits of non-interference magnets X and Z. Alternating current may be readily used in the switches or push-buttons on the floors or stations and on the car for controlling the operation of the motor, and I have so indicated its use, the heavy lines leading to the floors and stations and to the car indicating direct or rectified current-controlling circuits, as do the heavy lines throughout the diagram of Fig. 2, while the light lines in said diagram represent the motor-circuits and the circuits of the switches or push-buttons on the car and at the stations.

In order to facilitate an understanding of the operation of the apparatus before describing its operation, the rectified current-circuits will be traced. Rectified current is supplied from the generator end of the motor-generator H, starting from the positive brush marked with a +, as follows: from the motor-generator by wire 116 to the point 117, and from thence the circuit branches, one branch continuing by wire 116 to the point $117^a$, thence through brake-magnet R and still by wire 116 to contact 99 of reversing-switch W. According to the position of said reversing-switch, circuit may be completed between contact 99 and either one of the contacts 103 and 107, and then the circuit will continue by wire 116 to the point 118 and from thence still by wire 116 back to the negative brush of the generator. It will thus be seen from the circuit traced, including the brake-magnet R, that as soon as the reversing-switch W is actuated to close the motor-circuits the circuit of the brake-magnet R will be closed.

The closure of the circuit of the brake-magnet R causes it to raise its core 83 and close contacts 73 and 81, thereby completing a circuit from the point $117^a$ on wire 116 through said contacts to and through contacts 31 and 36; from thence through magnet Q to a point 119 adjacent magnet D. From thence the circuit extends to a point 120 on wire 116, and so returns to the negative brush of the motor-generator by wire 116. The energizing of magnet Q through the completion of the circuit described by the closure of contacts 73 and 81, causes a short-circuiting of resistances $r$ and $s$ and the energizing of magnet P.

Starting again from the positive brush of the motor-generator by wire 116 a branch circuit extends from the point 117 by wire 121 to and through magnet 95 of doubly-wound magnet 94 and still by wire 121 to and through door-contacts 115 at the floors or stations through flexible cable 122 to safety-switch $116^a$ on the car, from thence back through flexible cable 122 and still by wire 121 to and through non-interference magnet Z to the point 123, thence by wire 121 to a series of branch wires connecting with contacts 124 of switches $q$, $q'$, and $q^2$, which switches correspond to the floors or stations. When one of the contacts 124 is attracted by one of the cores 125 of the doubly-wound magnets 126, circuit is completed from wire 121 through said contact 124 to the core 125, and from thence still by wire 121 to and through a winding or electromagnet 127 on doubly-wound magnet 126, and from thence still by wire 121 to one of the pairs of brushes 88 on the floor-controller T. From the pairs of brushes 88 current passes either to the brushes 90 92 or brushes 89 91, according to the position of the floor-controller T. If the floor-controller were in the position described, current would pass from brush 88, we will say, to brush 90, from thence to and through relay or magnet U, thence still by wire 121 to the point 120 on wire 116 and out by wire 116 to the negative brush of the motor-generator. Current would also pass from the outer one of brushes 88 by brush 92 and wire 128 to contact 98, controlled by governor S, thence to contacts 97 98 when these contacts are closed and to magnet K, passing through a portion of magnet K sufficient to actuate the speed-changing switch J, and from thence the current passes still by wire 128 to and through contacts 61 and 62 when they are closed, and thence by wire 128 to the point 119 adjacent relay or magnet D. From here current passes to the point 120, which is a common junction, as will be seen, for several circuits, and from thence circuit is completed back to the negative brush of the motor-generator by wire 116.

If, instead, circuit were closed to both of brushes 89 and 91 on the floor-controller T, current would pass from brush 89 by wire 129 to and through relay or magnet D and out, as before, to the negative brush of the generator, while current would pass from brush 91 by wire 130 to contacts 76 and 75 through one portion of magnet K sufficient to actuate speed-changing switch J, and from thence by wire 128 through contacts 61 and 62, and thence to the point 119 adjacent magnet D and out from the common junction 120 to different circuits by wire 116 to the negative brush of the motor-generator.

From the point 123 on the wire 121 adjacent non-interference magnet X a branch circuit, supplied with rectified current, will be completed through contact 131 to the core 132 of non-interference magnet X, thence through the rectified current-winding of said magnet and by wire 132 to the point 118 on the wire 116, and thence to the negative brush of the motor-generator, thereby energizing the rectified current-winding of non-interference magnet X.

Referring now to the alternating-current-controlling circuits represented in fine lines, it will be seen that an alternating-current circuit starts from the point 133 on the negative main $b$ and passes by wire 65 to contacts 114 of switch 93, controlling the circuits of the motor end of the motor-generator H. A branch circuit also leads from the alternating-current main $a$ by wire 64 to contact 134 of said switch 93, said connections serving to supply alternating current from the operation of the motor-generator H when switch 93 is closed, for when said switch is closed alternating current is supplied by wires 64 and 65 to the motor end of the motor-generator. The return-wire from the motor-generator to main $c$ is represented at $65^a$ and connects with the alternating-current main $c$ at a point 135.

From the point 136 on wire 65 leading from alternating-current main $b$ an alternating-current circuit passes through magnet 96 of doubly-wound magnet 94 and from thence by wire 136 to a point where branches lead through alternating-current windings 137 on the doubly-wound electromagnets 126, said alternating-current magnets 137 being wound upon cores 125, controlling contacts 124. From alternating-current magnets 137 parallel circuits lead by wires 138 to the push-buttons $g$ $g'$ $g^2$ at the stations Y Y' Y², a common return-wire 139 being provided for said push-button circuits connected through compensating resistance 140 to stationary contact 141 and from thence through movable contact 142, controlled by non-interference magnet Z, still by wire 139 back to alternating-current main $a$, thereby forming a complete circuit for any one of the push-buttons $g$ $g'$ $g^2$ at the stations, and one of the magnets 137 of doubly-wound magnets 126 and magnet 96 on doubly-wound magnet 94, controlling switch 93 for completing the circuit to the motor-generator H.

The push-buttons or switches $p$ $p'$ $p^2$ on the car corresponding to the floors or stations are connected, as shown, in parallel with the switches or push-buttons $g$ $g'$ $g^2$, and for this purpose wires 143 lead to the push-buttons on the car, while a common return-wire 144 is provided for the car push-button circuit, which, instead of passing directly to compensating resistance 140, leads instead through alternating-current winding 145 on the doubly-wound non-interference magnet X, and from thence the return-circuit for the car push-buttons passes still by wire 144 to the point 146 between compensating resistance 140 and stationary contact 141.

As will hereinafter appear when the operation of the apparatus is described in detail, by means of the arrangement of circuits and apparatus described interference with the movements of the car is prevented from the floors or stations while the car is in operation—that is to say, after the car has been called from any one station interference with its movements and cross connections and circuits cannot be completed from any other landing until the car has reached its destination and come to rest; but as soon as it is stopped it may again be started from some other floor or station. On the other hand, when the car has been started by the operation of a switch or push-button on the car, in which case the operator must of course be in the car itself, the motor will be operated to move the car to its desired destination and the apparatus will there bring the car to rest; but control of the motor and car will still be excluded from the floors or stations as long as the operator in the car may desire. He may restore control to the floors or stations by operating the safety-switch $116^a$ on the car or by opening and closing a well-door, thereby breaking the controlling-circuit at a door-contact 115 and completing said circuit again. This system of operation whereby control of the car is excluded from a floor or station after the car has come to rest prevents accidents in a great many cases and is a very desirable feature of automatic elevator control of the class described. I have patented this invention in its broad features in United States Patent No. 683,689, granted to me October 1, 1901, wherein the invention is fully disclosed and described. I prefer to combine this important feature with my improved speed-controlling apparatus in starting and stopping the apparatus herein disclosed and have so devised the apparatus that this non-interference feature is automatically brought into operation.

The operation of the apparatus disclosed in the diagram of Fig. 2 is as follows: It will be assumed that switch 111, included in the mains $a$, $b$, and $c$, is closed, that switches 113 in the mains are closed, that the car C is at rest at station Y—that is, the bottom station of the series—and that the floor-controller T is in the position shown in the diagram and the remaining parts of the apparatus are in the positions shown, with the motor A at rest and the brake applied. Let it be desired to call the car C to the uppermost station $Y^2$. The operation of the apparatus will first be described when switch or push-button $g^2$ at station $Y^2$ is manipulated to start the motor and bring the car to station $Y^2$. Then the operation will be described when the car is brought from station Y to station $Y^2$ by the manipulation of push-button $p^2$ on the car. Let the push-button $g^2$ at station $Y^2$ be manipulated to close the alternating-current-controlling circuit connected thereto, then an alternating-current circuit will be completed from the main $b$ at the point 133 through magnet 96 and by wire 136 through magnet 137 of doubly-wound magnet 126, controlling switch $q^2$, and from thence by wire 138 to and through push-button $g^2$ and by wire 139 to compensating resistance 140, from thence through the normally closed contacts 141 and 142, and still by wire 139 to the alternating-current main $a$. The closure of the alternating-current circuit just described through push-button $g^2$ energizes magnet 96 of doubly-wound magnet 94 and also energizes magnet 137 of doubly-wound magnet 126, causing them to attract the contacts which they control. The closure of the contacts at switch 93, controlled by doubly-wound magnet 94, closes an alternating-current circuit, as has heretofore been described, to the motor end of the motor-generator H, causing said motor-generator to rotate and supply rectified current to the controlling-circuits represented in heavy lines. The energizing of magnet 137 serves to attract contact 124 of switch $q^2$, thereby closing a rectified current-controlling circuit between said contact 124 and the core 125 of magnet 137, and then the following rectified-current circuits will become energized: A circuit will be completed from the positive brush of the motor-generator by wire 116 to the point 117, and from thence the current will branch, one portion passing by wire 121 to and through magnet 95 of doubly-wound magnet 94 and still by wire 121 to and through the door-contacts 115 at the floors or stations, and from thence through the flexible cable 122 to safety-switch 116ᵃ on the car and back again through the flexible cable still by wire 121 through non-interference magnet Z, and from thence to contact 124 of switch $q^2$, and this switch being closed the current will pass to the core 125 and then through magnet 127, wound on said core 125, since the circuit of said magnet is connected to the core, and from thence the current will pass to brushes 88. The floor-controller T being in the position shown in the drawings, a circuit will be completed from brush 88, bearing upon the inner segment to brush 90, from thence to and through relay or magnet U and still by wire 121 to the common junction-point 120 on wire 116, and from thence by wire 116 to the negative brush of the motor-generator. When the circuit described energized by rectified current is completed, it will be seen that the energizing of non-interference magnet Z attracts contact 142 and breaks circuit between said contact and contact 141, so that the finger may be removed from the push-button manipulated, since the push-button circuits at the stations are cut out of circuit by non-interference magnet Z. This is true, because said magnet Z controls contacts 141 and 142 in the common return-circuit for the push-buttons at the floors or stations, and as long as magnet Z remains energized no circuit can be completed through a floor push-button. The cutting out of the floor push-buttons at magnet Z also serves to break the circuit of magnet 137, which has closed a circuit at switch $q^2$, and likewise magnet 96, controlling switch 93, has become deënergized; but the energizing of magnet 127 on the same core 125 with magnet 137 serves to maintain contact 124 attracted, thereby maintaining the rectified-current-controlling circuit closed at switch $q^2$, while the energizing of magnet 95 of doubly-wound magnet 94 serves to maintain switch 93 closed, thereby maintaining a circuit for the motor-generator, whereby it will rotate and continue to supply rectified current to the controlling-circuits. In other words, the alternating-current coils or magnets 96 and 137 serve to actuate the switches they control, but the rectified-current coils 127 and 95 act as holding-coils. The energizing of magnet or relay U serves to actuate the controlling-switch W, moving the central contacts into contact with contacts 103, 104, 105, and 106, thereby closing the motor-circuits in such manner as to cause rotation of the motor A in a direction to move the car upward as soon as the proper starting-current is admitted to the motor.

It will be remembered in the description of the diagram of Fig. 1 that maximum current is not admitted to the motor at first; but only a small current is admitted to the stator through resistances *r* and *s*, which current is insufficient to start the motor, but will prevent its backward rotation with the brake removed.

I have now described the operation so far as to include the closing of the motor-circuits, thereby admitting minimum current to the stator; but it will be seen that when reversing-switch W is actuated the circuit of the brake-magnet R is also completed as follows: from the positive brush of the motor-generator by wire 116 to the point 117, and still by wire 116 to and through brake-magnet R, and by wire 116 to contact 99, from thence to contact 103, then to the common junction-point 120, and back by wire 116 to the negative brush of the motor-generator. The brake-magnet takes a certain time to act, since it has a definite time constant, so that a small current is admitted for an appreciable length of time to the motor before the brake is raised, thereby closing contacts 73 and 81 and energizing magnet Q, controlling the means for short-circuiting resistances *r* and *s*. As soon as brake-magnet R raises the brake-shoe 83 by raising its core 82 contacts 73 and 81 will be closed and a circuit will be completed from the point 117ª, adjacent magnet R, to and through normally closed contacts 36 and 31, through magnet Q to a point adjacent relay D, and from thence out, as heretofore described. The energizing of magnet Q serves to short-circuit the resistances *r* and *s*, as heretofore described, thereby admitting full current to the motor; but in the meantime it will be remembered that magnet L of doubly-wound magnet O was energized when minimum current was admitted to the motor, and contacts 61 and 62 were separated by said magnet, and then when resistance *s* was short-circuited by the closure of contacts 56 and 57 magnet L was cut out of circuit and magnet P has become energized and possesses sufficient strength to maintain contacts 61 and 62 separated until the current in the motor reduces to normally running current or, in other words, until full slow speed has been reached, at which time magnet P reduces in strength to such an amount as to allow core 60 to be attracted under the action of spring *x*, thereby closing contacts 61 and 62.

Assuming that the brake has been raised, resistances *r* and *s* short-circuited, and full slow speed attained, and contacts 61 and 62 closed, and also assuming that in this instance the governor S and the contacts it controls are not utilized, but that the circuit is normally completed between contacts 75 and 76 and 97 and 98, then it will be seen that when full slow speed has been reached a circuit will be completed for a portion of magnet K, whereby the speed-changing switch J is actuated to change the connections of the motor and increase its speed to full speed. It was hereinbefore stated that the governor S and doubly-wound magnet O were the equivalents of each other in the operation of my apparatus, and therefore the operation has been described with the use of the doubly-wound magnet O only.

The circuit for magnet K is completed as follows: from brush 88, bearing on the outer segment of floor-controller T, to brush 92, also bearing thereon, and by wire 128 to and through the upper portions of magnet K, and still by wire 128 to and through contacts 61 and 62 to the point 119 and common junction 120, and from thence back to the negative brush of the generator. Magnet K raises its core and changes the motor connections, as hereinbefore described, in such manner as to decrease the magnetic poles of the stator from, I will say, eight to four, thereby increasing the speed of the rotor, and the motor will come up to full speed.

The actuation of speed-changing switch J serves to open contacts 31 and 36, thereby de-energizing magnet Q and allowing its core to drop, thereby removing the short circuits around resistances *r* and *s*; but these resistances, as heretofore described, will not be thrown back into the motor-circuits at this time, for the fast-speed connections of the motor are completed by means of branches around said resistances, said branches leading to the contacts 34 and 35. The motor will continue to rotate and will move the car in the desired direction upward until station Y² is nearly reached, when floor-controller T will have rotated so far in the direction of the arrow as to break circuit between brushes 88 and 92—that is to say, the insulation 84 will have been brought beneath the brush 88, thereby breaking the circuit, and this, it will be seen, will break the circuit of magnet K, thereby allowing its core 25 to drop and change the circuits of the stator again from fast-speed connections to slow-speed connections; but the current now entering the windings of the stator will have to pass first through resistances *r* and *s*, and it will so continue to do for an appreciable length of time, because although the circuit of magnet Q is completed when switch J is actuated, because contacts 31 and 36 are closed, still said magnet Q has a certain definite time constant and will not actuate its core 63 immediately. As soon as it actuates its core 63 resistances *r* and *s* will be again cut out of circuit and full current will be admitted to the slow-speed connections. This operation, as described, tends to prevent slowing down too quickly.

Shortly after the insulation 84 on floor-controller T breaks the circuit between brushes 88 and 92 the insulation 86 passes beneath the inner brush 88 and breaks the circuit between said brush and brush 90, thereby de-energizing relay or magnet U, which breaks the motor-circuits at the reversing-switch W and stops the motor.

The whole construction and operation described is designed to bring the car to a stop at the desired station without jar or shock. The car having been brought to rest and the motor stopped, the apparatus will again assume normal conditions and will be in readiness to be again set in operation from any one of the stations or from the car.

I will next describe the operation of the apparatus when a push-button has been manipulated on the car, it being understood that one of the objects in view in this case is to exclude control of the motor from the stations after the car has come to rest.

In view of the descriptions of the various operation of the apparatus heretofore given it is believed to be unnecessary to trace out all circuits which become energized when a car push-button has been manipulated, and only so much of them will be again traced as will be necessary to an understanding of the operation in this case.

Let it be assumed that the car C is at the bottom of its travel and that it is desired to direct it to station $Y^2$. In this case the operator will manipulate the push-button $p^2$ on the car, and the apparatus being in the condition shown in Fig. 2 alternating-current circuits will be completed from main $b$ at the point 133 through magnet 96 and by wire 136 to and through magnet 137 of controlling-switch $q^2$, from thence by wire 138 to a point 200, and by wire 143 through flexible cable 122 to and through push-button $p^2$, which has been manipulated to close the circuit, and from thence back by common return-wire 144 through flexible cable 122, and still by wire 144 to and through magnet 145 of doubly-wound non-interference magnet X, and thence by wire 144 to the point 146 adjacent compensating resistance 140. From here circuit is completed through contacts 141 and 142 and by wire 139 to the alternating-current main $a$.

As hereinbefore described, circuits are completed to start the motor, the brake is raised, the motor-generator is started for supplying rectified current to the controlling-circuits, the speed of the motor is automatically changed from slow to fast on starting and again automatically changed from fast to slow on stopping, the floor-controller T is operated and moves in unison with the travel of the car to change the speed of the motor on stopping and stop the motor at the desired station to which the car has been directed. It will, however, be observed that in this instance the energizing of magnet 145 of doubly-wound non-interference magnet X serves to attract contact 131, thereby completing a branch rectified-current circuit from the point 123 through contact 131 to the core $132^a$, and from thence through rectified-current winding of magnet X, and then by wire 132 to the wire 116 at the point 118, and then to the negative brush of the motor-generator.

In the operation of the apparatus the energizing of non-interference magnet Z breaks the push-button circuits of the stations and the core at contacts 141 and 142; but the energizing of the rectified-current coil of magnet X serves to maintain a circuit completed through said non-interference magnet Z even after the motor has come to rest—that is to say, even after the controlling-circuits have been broken at the floor-controller T. This is true, because it will be seen that after circuits are broken at the floor-controller T by reason of the insulated portions on disk $79^a$ coming beneath the brushes bearing on the conducting-segments, a circuit supplied with rectified current will still remain energized, as follows: Starting from the positive brush of the motor-generator, the said circuit includes magnet 95, the door-contacts 115, the safety-switch $116^a$ on the car, magnet Z, the rectified-current winding of magnet X, and from thence the circuit passes by wire 132 and wire 116 back to the negative brush of the generator. As long as the circuit just described remains completed it is manifestly impossible to start the car from the stations even although the car remains at rest. It will be seen that it is not possible to control the operation of the motor and start the car from a switch or push-button at the stations until either one of the doors has been opened and again closed, thereby deënergizing magnet Z and allowing contacts 141 and 142 to close, or else the safety-switch $116^a$ or some equivalent switch must be opened and then closed, in which case magnet Z will also be deënergized.

The circuit described for excluding control of the car and motor from the stations after the car has come to rest will be constantly supplied with rectified current until, as stated, a suitable switch or a door-contact has been manipulated, because the non-interference circuit also includes the magnet 95, which maintains the switch 93 closed, thereby supplying alternating current to the motor-generator and causing it to rotate and supply rectified current to the controlling-circuit. The deënergizing of magnet 95 opens the circuit of the motor-generator on the motor side, thereby stopping the same.

The operation of the mechanical governor S (shown in Fig. 2) is identical with that of the governor shown in Fig. 1, except that in Fig. 2 the governor is shown controlling two sets of contacts. This is made necessary from the fact that no matter where the car may be in its travel—that is to say, no matter at which station the car has been stopped—magnet K must be energized through circuits controlled by the floor-controller for causing the desired changes of speed in the motor.

From the descriptions of apparatus and the operation thereof herein given I am not to be understood as limiting myself to the apparatus shown and described for carrying out my invention. I have illustrated and described suitable apparatus, circuits, and connections for carrying out my broad invention, and it is obvious to those skilled in the art that many different arrangements of circuits and connections and electromagnetic controlling apparatus may be devised for accomplishing the ends I have in view. Obviously, also, my invention is applicable to different uses, and some features of my invention may be used without others, and each separate feature may be used alone, if desired. For these reasons and without attempting to enumerate equivalents, therefore,

I claim, and desire to obtain by Letters Patent, the following:

1. The combination of an alternating-current motor and means for automatically changing the speed of the same from slow to fast and from fast to slow during its operation, substantially as described.

2. The combination of an alternating-current motor, automatic means for changing the speed of the same from slow to fast after starting and automatic means for changing the speed from fast to slow before stopping, substantially as described.

3. The combination of an alternating-current motor, means for starting and stopping the same, and means controlled by said starting and stopping means for reducing the speed of the motor before stopping, substantially as described.

4. The combination of an alternating-current motor, means for starting and stopping the same and means controlled by said starting and stopping means for automatically starting the motor at a slow rate of speed, then increasing its speed to full speed, and for automatically reducing the speed of the motor again before stopping, substantially as described.

5. The combination of an alternating-current motor, means for starting the same at a slow rate of speed, automatic means for increasing the speed to full speed after the motor has started at slow speed, and means for automatically reducing the speed of the motor to slow speed again before stopping, substantially as described.

6. The combination of an alternating-current motor, means for starting, stopping and reversing the motor, and automatic means for changing its speed from slow to fast on starting, substantially as described.

7. The combination of an alternating-current motor, means for starting, stopping and reversing the motor, automatic means for changing from slow to fast on starting and automatic means for changing back to slow speed before stopping, substantially as described.

8. The combination of an induction-motor, means for starting, stopping and reversing the motor, automatic means for changing its speed from slow to fast on starting, and automatic means for changing back to slow speed before stopping, substantially as described.

9. The combination with an induction-motor of automatic means for changing its speed from slow to fast on starting and automatic means for changing back to slow speed before stopping, substantially as described.

10. The combination of an alternating-current motor, a manual switch for controlling the starting and stopping of the motor, automatic switches controlling the reversing of the motor, and automatic means for changing the speed of the motor from slow to fast on starting and from fast to slow on stopping, substantially as described.

11. The combination of an induction-motor and means for admitting current to the stator on starting, first through resistance, whereby the main current is reduced, and other means for then admitting the full current to the stator, substantially as described.

12. The combination of an induction-motor, means for starting the same with a given number of poles in the stator, means for thereafter decreasing said number of poles, thereby increasing the speed of the motor, means for again increasing the number of poles of the stator before stopping, whereby the rate of speed of the motor is reduced and means for causing such reduction of speed rate to take place gradually, substantially as described.

13. The combination of an induction-motor, means for starting and stopping the same, and automatic means for decreasing the number of poles of the stator after starting and for again increasing the said number of poles before stopping, substantially as described.

14. The combination of an induction-motor, a brake therefor and means for admitting a small current to the stator of said motor before raising the brake, substantially as described.

15. The combination of an induction-motor, a brake therefor and means for raising the brake before admitting maximum current to the stator, substantially as described.

16. The combination of an alternating-current motor, circuits and connections therefor, whereby the rate of speed of the same may be changed from slow to fast and from fast to slow, said circuits and connections being controlled by an electromagnetic switch, and automatic means for actuating said switch at a predetermined time in the operation of the motor, substantially as described.

17. The combination of an alternating-current motor, means for changing the speed of the same controlled by an electromagnetic switch, and means for actuating said switch at a predetermined time in the operation of the motor, substantially as described.

18. The combination of an alternating-current motor and electromagnetically-controlled means for changing the speed of the same by changing the number of field-poles of the motor, substantially as described.

19. The combination of an alternating-current motor, a switch controlling the speed rate of the same by varying the number of field-poles of the motor, and automatic means for actuating said switch, substantially as described.

20. The combination of an alternating-current motor, a brake therefor, means for admitting small current to the motor before raising the brake, means for starting the motor and running the same at a slow rate of speed and means actuated after the motor has attained said slow rate of speed, whereby the speed of the motor is changed to fast speed, substantially as described.

21. The combination of an alternating-current motor, means for starting the same at a slow speed and means operative after the motor has attained said slow speed for increasing the speed of the motor, substantially as described.

22. The combination of an alternating-current motor, means for starting the motor and bringing the same up to a slow rate of speed, and means operative after the current in the motor has reduced to normal current for said slow speed, for increasing the speed of the motor, substantially as described.

23. The combination of an alternating-current motor, means for starting the same at a slow rate of speed, and means operative after the current in the motor has reached normal running current for said slow rate of speed, for changing said speed, substantially as described.

24. The combination of an alternating-current motor and automatic means for changing the speed of the same after starting when the current has reduced to normal running current, substantially as described.

25. The combination of an induction-motor and means for changing the speed of the same after starting when the current has reduced to normal running current, substantially as described.

26. The combination of an alternating-current motor and automatic means for changing the rate of speed of the same at a predetermined time after starting, substantially as described.

27. The combination of an induction-motor and automatic means for changing the speed of the same at a predetermined time after starting, substantially as described.

28. The combination of an alternating-current motor, means for starting the same and bringing it up to a uniform slow speed, and means operative when approximately full slow speed has been attained for changing the speed of the motor, substantially as described.

29. The combination of an induction-motor, means for starting the same at a slow rate of speed and means operative when approximately full slow speed has been reached for increasing the speed of the motor to full speed, substantially as described.

30. The combination of an alternating-current motor and automatic means for changing the speed of the motor from slow to fast when approximately full slow speed has been attained after starting, substantially as described.

31. The combination of an induction-motor, means for changing the speed of the same from slow to fast when approximately full slow speed has been reached, and means for automatically changing from fast to slow speed before stopping, substantially as described.

32. The combination of an alternating-current motor, a switch for changing its number of field-poles, an electromagnet controlling said switch, and means for controlling said magnet consisting of a doubly-wound electromagnet, one winding of which opens the circuit of said electromagnet controlling said switch, while the other winding maintains said circuit open for a given time after starting, substantially as described.

33. The combination of an alternating-current motor, a switch for changing its number of poles, an electromagnet for controlling said switch, and means for controlling said magnet consisting of a doubly-wound electromagnet one winding of which opens the circuit of said electromagnet controlling said switch, while the other winding maintains said circuit open until the motor has reached approximately full slow speed after starting, substantially as described.

34. The combination of an alternating-current motor, an electromagnetic switch for changing the speed of the motor, a governor controlling contacts in the circuit of said switch for closing said circuit when the motor has reached approximately full slow speed, and means in the circuit of said switch for deënergizing the same, substantially as described.

35. The combination of an electric motor, an electromagnetic switch for changing the speed of the motor, a governor controlling the circuit of said switch for closing said circuit when the motor has reached approximately full slow speed, and means in the circuit of said switch for deënergizing the same, substantially as described.

36. The combination of an alternating-current motor, an electromagnetic switch for changing the speed of the motor from slow to fast, and from fast to slow, a governor controlling contacts in the circuit of said switch for closing said circuit when the motor has attained approximately full slow speed, whereby the speed is changed from slow to fast and means in the circuit of said switch for deënergizing the same and changing from fast to slow speed, substantially as described.

37. The combination of an alternating-current motor, means for starting and stopping the same, means for introducing resistance into the circuit of the motor, and means for removing it again before stopping, substantially as described.

38. The combination of an alternating-current motor, circuits and connections for changing from fast to slow speed, means for completing the slow-speed connections through resistance when changing from fast to slow speed, and means for thereafter removing said resistance from the slow-speed connections, substantially as described.

39. The combination of an alternating-current motor, means for starting and stopping the motor and circuits and connections for changing the speed, means for admitting a small current to the motor through resistance included in the slow-speed connections on starting and for then cutting said resistance out of circuit, means for changing from the slow to the fast speed connections and means for again completing the slow-speed connections first through said resistance when changing from fast to slow speed and means for thereafter cutting said resistance out of circuit, substantially as described.

40. In an elevator, the combination of a car, an alternating-current motor, means for starting and stopping the motor and automatic means for starting the car slowly for increasing to full speed and for reducing the speed of the car again before stopping, substantially as described.

41. In an elevator, the combination of a car, an alternating-current motor, means for starting and stopping the car, means controlled by said starting and stopping, means for automatically starting the motor slowly then increasing its speed to full speed and for automatically reducing the speed of the motor again before stopping, substantially as described.

42. In an elevator, the combination of a car, an alternating-current motor, manual switches on the car controlling the starting and stopping of the motor, automatic switches controlling the reversing of the motor, and automatic means for changing the speed of the motor from slow to fast on starting, and from fast to slow on stopping, substantially as described.

43. In an elevator, the combination of a car, a motor, a brake and means controlled from the car for admitting a small current to the motor for a given time, the length of such time being controlled by the operation of the brake, substantially as described.

44. The combination of an alternating-current motor, a brake and a magnet for said brake, means for admitting a weak current for an appreciable length of time for the motor on starting, and means controlled by said brake-magnet for admitting full current to the motor, substantially as described.

45. The combination of an alternating-current motor, a brake, means for admitting small current to the motor at first, and means controlled by the lifting of the brake for admitting full current to the motor, substantially as described.

46. In an elevator, the combination of a car, a motor, a brake and means controlled by the brake for admitting current to the motor, substantially as described.

47. The combination of an alternating-current motor, a brake, and means controlled by the brake for admitting current to the motor, substantially as described.

48. In an elevator, the combination with a car and an alternating-current motor, of motor-controlling means connected to change from fast to slow speed, and other means for causing said change to take place gradually, thereby preventing a sudden change of speed, substantially as described.

49. In an elevator, the combination with a car and an alternating-current motor, means for starting the motor at a slow rate of speed, and motor-controlling means connected to thereafter change such speed rate to fast, and connections for returning to said slow rate of speed gradually before stopping, substantially as described.

50. In an elevator, the combination of a car, an alternating-current motor, circuits and connections whereby the rate of speed of the motor may be changed from slow to fast and from fast to slow, said circuits and connections being controlled by an electromagnetic switch and automatic means for actuating said switch at predetermined points in the traverse of the car, substantially as described.

51. In an elevator, the combination of a car, an alternating-current motor, means for changing the speed of the motor controlled by an electromagnetic switch and means for actuating said switch at a predetermined point in the traverse of the car, substantially as described.

52. In an elevator, the combination of a car, an alternating-current motor, a brake, means for admitting small current to the motor before raising the brake, means for starting the motor and running the same at a slow rate of speed and means actuated after the motor has attained said slow rate of speed for changing the speed to full speed, substantially as described, 53. In an elevator, the combination of a car, an alternating-current motor and automatic means for changing the speed of the car after starting when the current in the motor has reduced to normal slow-speed-running current, substantially as described.

54. In an elevator, the combination of a car, an alternating-current motor, means for starting the motor and bringing it up to a uniform slow speed and means automatically operative when approximately full slow speed has been attained, for changing the speed of the car, substantially as described.

55. In an elevator, the combination of a car, an alternating-current motor and means automatically operative when a predetermined motor speed has been attained for changing the speed of the car, substantially as described.

56. In an elevator, the combination of a car and an alternating-current motor and automatic means for increasing the speed of the car when a given motor speed has been attained, substantially as described.

57. In an elevator, the combination of a car, an alternating-current motor and automatic means for changing the speed of the car from slow to fast when the motor has attained approximately full slow speed after starting, substantially as described.

58. In an elevator, the combination of a car, an alternating-current motor, means governed by the speed of the motor for increasing the speed of the car after starting and means for reducing the speed of the car before stopping, substantially as described.

59. In an elevator, the combination of a car, an alternating-current motor and means for increasing the rate of speed of the car after starting and for reducing its speed rate before stopping, substantially as described.

60. The combination of an alternating-current motor and means for changing the speed of the same controlled by rectified current, substantially as described.

61. The combination with a motor of circuits and apparatus for changing the speed of the same and means for supplying rectified current to actuate the said apparatus, substantially as described.

62. The combination with a motor of apparatus for varying the speed of the same, controlling-circuits for said apparatus and means for supplying rectified current to said circuits, substantially as described.

63. The combination of a motor, means for starting and stopping the same included in a circuit suitably energized by rectified currents, an electromagnetic switch for reversing the motor actuated by rectified currents and means for controlling the speed of the motor actuated by rectified current, substantially as described.

64. The combination of a motor, a brake actuated by rectified currents and means controlled by the brake for changing the speed of the motor, substantially as described.

65. The combination of a motor and circuits and connections for controlling said motor, including therein a brake-magnet, reversing-switch, starting-switch and speed-controlling magnets and means for supplying rectified current to said circuits, substantially as described.

66. In an elevator, the combination of a motor-car and stations, circuits and connections connected to the stations and motor for controlling the operation of the motor, means for supplying rectified current to said circuits and means included in said circuits and connections for controlling the speed of the motor, substantially as described.

67. The combination of a motor-car and stations, a floor-controller and circuits and connections including the motor and floor-controller for controlling the motor, and means for supplying rectified current to said circuits, substantially as described.

68. In an elevator, the combination of a motor-car and stations, a floor-controller, circuits and connections including the motor and floor-controller, and means for supplying rectified current to said circuits, substantially as described.

69. The combination of a motor-car and stations, means for controlling the car from the stations, circuits and connections for changing the speed of the motor and means for supplying rectified current to said circuits, substantially as described.

70. The combination of a motor-car and stations, means for controlling the car from the car, circuits and connections for changing the speed of the motor and means for supplying rectifying-current to said circuits, substantially as described.

71. The combination of a motor-car and stations, means for controlling the car from both the car and stations, circuits and connections for changing the speed of the motor and means for supplying rectified current to said circuits, substantially as described.

72. The combination of an alternating-current motor, a car and stations, means for setting the motor in operation whereby the car is moved to a particular station and there automatically stopped, and automatic means whereby the rate of speed of the car is increased from slow to fast on starting and again reduced to slow speed before stopping, substantially as described.

73. The combination of an alternating-current motor, a car and stations, means whereby the car may be called and automatically stopped at a desired station, and automatic means for changing the speed of the car from fast to slow before stopping, substantially as described.

74. The combination of a car, an alternating-current motor, floors or stations, and a floor-controller for determining both the travel of the car and changes in speed of the motor, substantially as described.

75. In an elevator, the combination of a car and alternating-current motor, a floor-controller and connections controlled by the floor-controller whereby the car is reduced in speed before being stopped, substantially as described.

76. In an elevator, the combination of a car, an alternating-current motor, a floor-controller and circuits and connections controlled by the floor-controller for changing the speed of the car and for stopping the same, substantially as described.

77. In an elevator, the combination of an alternating-current motor, a car and a floor-controller arranged to determine the direction of movement of the car, its extent of travel and the speed of the motor, substantially as described.

78. In an elevator, the combination of an alternating-current motor, a car, a floor-controller, circuits and connections including the floor-controller and the motor for changing the speed of the motor, and a governor controlling said connections, substantially as described.

79. In an elevator, the combination of an alternating-current motor, a car, a floor-controller, circuits and connections including the floor-controller and a motor for changing the speed of the motor and means dependent upon the speed of the motor for operation whereby said connections are controlled, substantially as described.

80. The combination of an alternating-current motor, means for admitting a small current to the motor at first through resistance, a pole-changing switch and contacts controlled by said switch for controlling the current admitted to the motor, substantially as described.

81. The combination of an alternating-current motor, slow and fast speed connections for the motor, and a switch controlling the same, means for first admitting small current through resistance to the slow-speed connections and for then admitting full current through said connections, and means controlled by said switch for including said resistance in the slow-speed connections after having changed to the high-speed connections, substantially as described.

82. The combination of an alternating-current motor, slow and fast speed connections therefor, a switch controlling the same, means for first admitting current through resistance to the slow-speed connections and for cutting out said resistance before changing to the high-speed connections, and means controlled by said switch for again including said resistance in the slow-speed connections after changing to high speed, substantially as described.

83. The combination of an alternating-current motor, and an automatic switch for changing from slow to high speed connections when full slow speed has been reached, substantially as described.

84. The combination of an alternating-current motor and an automatic switch for changing from slow to high speed connections and back again, substantially as described.

85. The combination of an alternating-current motor and a switch automatically actuated for changing from slow to high speed connections and back again, substantially as described.

86. In an elevator the combination of a car, an alternating-current motor and automatically-actuated means for changing from slow to high speed connections and back again during the travel of the car, substantially as described.

87. In an elevator, the combination with an alternating-current motor of a car and stations, alternating-current-controlling circuit for the car and stations, switches in said circuit for controlling the motor, and a rectified-current circuit including the car and stations, each of said circuits controlling the other, substantially as described.

88. The combination of a motor and alternating-current and rectified-current controlling circuits therefor, each of which circuits controls the other, substantially as described.

89. The combination of a motor, a floor-controller, a rectified-current circuit including the floor-controller, and an alternating-current circuit connected to the car and stations, substantially as described.

90. The combination of a motor-car and a station, motor-controlling devices connected to the car and station, a brake and means for raising the brake before admitting maximum current to the motor, substantially as described.

91. The combination of a motor-car and a station, motor-controlling devices connected to the car, a brake and means for raising the brake before admitting maximum current to the motor, substantially as described.

92. The combination of a motor-car and a station, motor-controlling devices connected to the station, a brake and means for raising the brake before admitting maximum current to the motor, substantially as described.

93. In an elevator, the combination of a motor, a car, floors and stations, means for supplying rectified current to the controlling-circuits of the motor and a floor-controller and speed-changing switch included in said rectified-current-controlling circuit, substantially as described.

94. The combination of an alternating-current motor, apparatus for reducing the speed of the motor before stopping, circuits controlling said apparatus, and means for supplying rectified current to said circuits, substantially as described.

95. The combination of an alternating-current motor, apparatus for changing the speed of the motor from slow to fast and from fast to slow, circuits controlling said apparatus, and means for supplying rectified current to said circuits, substantially as described.

In testimony whereof I have signed my name to this specification in the presence of two subscribing witnesses.

JOHN D. HILDER.

Witnesses:
 CHARLES B. MANVILLE,
 F. W. NEWELL.